(12) United States Patent
Seo et al.

(10) Patent No.: US 10,721,644 B2
(45) Date of Patent: Jul. 21, 2020

(54) METHOD FOR REPORTING CHANNEL STATE INFORMATION FOR DISCONTINUOUS TRANSMISSION IN WIRELESS COMMUNICATION SYSTEM AND DEVICE FOR SAME

(71) Applicant: LG ELECTRONICS INC., Seoul (KR)

(72) Inventors: Hanbyul Seo, Seoul (KR); Joonkui Ahn, Seoul (KR); Hanjun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/554,203

(22) PCT Filed: Mar. 16, 2016

(86) PCT No.: PCT/KR2016/002661
§ 371 (c)(1),
(2) Date: Aug. 28, 2017

(87) PCT Pub. No.: WO2016/148511
PCT Pub. Date: Sep. 22, 2016

(65) Prior Publication Data
US 2018/0084447 A1   Mar. 22, 2018

Related U.S. Application Data

(60) Provisional application No. 62/135,662, filed on Mar. 19, 2015.

(51) Int. Cl.
*H04W 24/10*   (2009.01)
*H04L 1/00*   (2006.01)
(Continued)

(52) U.S. Cl.
CPC .............. *H04W 24/10* (2013.01); *H04L 1/00* (2013.01); *H04L 5/0007* (2013.01);
(Continued)

(58) Field of Classification Search
CPC ..... H04W 24/10; H04W 72/04; H04W 74/00; H04W 56/001; H04W 88/02;
(Continued)

(56) References Cited

U.S. PATENT DOCUMENTS 10,057,839 B2 * 8/2018 Ng ........................ H04W 48/16
10,129,793 B2 * 11/2018 Ryoo .................... H04W 24/08
(Continued)

FOREIGN PATENT DOCUMENTS

WO   2013/167557 A1   11/2013
WO   2015/023910 A2   2/2015

*Primary Examiner* — Ian N Moore
*Assistant Examiner* — Rushil Parimal Sampat
(74) *Attorney, Agent, or Firm* — Dentons US LLP

(57) ABSTRACT

Disclosed is a method by which a terminal reports channel status information to a base station in a wireless communication system. Particularly, the method comprises the steps for attempting to detect a reference signal repeatedly transmitted multiple times for each reference signal transmission unit; setting the reference signal transmission unit as an effective reference resource for the channel state information when the reference signal is detected in a preset section within the reference signal transmission unit; measuring the channel state information at the effective reference resource; and reporting the channel state information to the base station.

6 Claims, 10 Drawing Sheets

(51) Int. Cl.
*H04W 56/00* (2009.01)
*H04W 88/02* (2009.01)
*H04W 88/08* (2009.01)
*H04L 5/00* (2006.01)

(52) U.S. Cl.
CPC ......... *H04L 5/0048* (2013.01); *H04W 56/001* (2013.01); *H04L 5/005* (2013.01); *H04L 5/0057* (2013.01); *H04W 88/02* (2013.01); *H04W 88/08* (2013.01)

(58) Field of Classification Search
CPC ...... H04W 88/08; H04L 5/0048; H04L 5/005; H04L 5/0057; H04L 5/0007; H04L 1/00
See application file for complete search history.

(56) References Cited

U.S. PATENT DOCUMENTS

| | | | |
|---|---|---|---|
| 2014/0112289 A1 | 4/2014 | Kim et al. | |
| 2014/0378157 A1* | 12/2014 | Wei | H04W 16/14 455/454 |
| 2015/0055588 A1* | 2/2015 | Yerramalli | H04W 72/0446 370/329 |
| 2016/0029238 A1* | 1/2016 | Chen | H04W 24/10 370/252 |
| 2016/0135148 A1* | 5/2016 | Novlan | H04L 1/00 370/329 |
| 2017/0150388 A1* | 5/2017 | Wen | H04L 5/00 |

\* cited by examiner (a) Control-plane protocol stack (b) User-plane protocol stack (a) 1 Tx or 2 Tx (b) 4 Tx

METHOD FOR REPORTING CHANNEL STATE INFORMATION FOR DISCONTINUOUS TRANSMISSION IN WIRELESS COMMUNICATION SYSTEM AND DEVICE FOR SAME

This application is a National Phase Application of International Application No. PCT/KR2016/002661, filed on Mar. 16, 2016, which claims the benefit of U.S. Provisional Application No. 62/135,662, filed Mar. 19, 2015, which are hereby incorporated by reference in their entirety for all purposes as if fully set forth herein.

TECHNICAL FIELD

The present invention relates to a wireless communication system, and more particularly, to a method for reporting channel state information for discontinuous transmission in a wireless communication system and a device for the same.

BACKGROUND ART

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously for broadcast service, multicast service, and/or unicast service.

A single eNB manages one or more cells. A cell is set to operate in one of the bandwidths of 1.44, 3, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency region in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency region in which the UE can transmit data, a coding scheme, a data size, HARQ information, etc. by transmitting UL scheduling information to the UE. An interface for transmitting user traffic or control traffic may be used between eNBs. A Core Network (CN) may include an AG and a network node for user registration of UEs. The AG manages UE mobility on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, new technological evolution is required to achieve future competitiveness. Specifically, cost reduction per bit, increased service availability, flexible use of frequency bands, simplified structure, an open interface, appropriate power consumption of UEs, etc. are required.

DISCLOSURE

Technical Problem

Based on the aforementioned discussion, an object of the present invention is to provide a method for reporting channel state information for discontinuous transmission in a wireless communication system and a device for the same.

Technical Solution

According to one embodiment of the present invention, a method for reporting channel state information from a user equipment (UE) to a base station in a wireless communication system comprises the steps of attempting to detect a reference signal repeatedly transmitted multiple times for each reference signal transmission unit; setting the reference signal transmission unit as a valid reference resource for the channel state information when the reference signal is detected at a preset period within the reference signal transmission unit; measuring the channel state information at the valid reference resource; and reporting the channel state information to the base station.

Also, a user equipment (UE) in a wireless communication system according to another embodiment of the present invention comprises a wireless communication module for transmitting and receiving a signal to and from a base station; and a processor for processing the signal, wherein the processor controls the wireless communication module to attempt to detect a reference signal repeatedly transmitted multiple times for each reference signal transmission unit, set the reference signal transmission unit as a valid reference resource for the channel state information when the reference signal is detected at a preset period within the reference signal transmission unit, measure the channel state information at the valid reference resource, and report the channel state information to the base station.

Preferably, the preset period is excluded from the valid reference resource for the channel state information. Also, the preset period is located at a front end of the reference signal transmission unit.

More preferably, the reference signal includes at least one of PSS (Primary Synchronization Signal), SSS (Secondary Synchronization Signal), CRS (Cell specific Reference Signal) and CSI-RS (CSI Reference Signal).

In the aforementioned embodiments, the channel state information is channel state information on an unlicensed band.

Advantageous Effects

According to the embodiment of the present invention, channel state information for discontinuous transmission in a wireless communication system can be measured and reported efficiently.

The effects of the present invention are not limited to the above-described effects and other effects which are not described herein will become apparent to those skilled in the art from the following description.

BEST MODE FOR CARRYING OUT THE INVENTION

The configuration, operation, and other features of the present invention will readily be understood with embodiments of the present invention described with reference to the attached drawings. Embodiments of the present invention as set forth herein are examples in which the technical features of the present invention are applied to 3GPP.

While embodiments of the present invention are described in the context of LTE and LTE-A, these embodiments are purely exemplary. Therefore, the embodiments of the present invention are applicable to any other communication system as long as the above definitions are valid for the communication system. In addition, while the embodiments of the present invention are described in the context of Frequency Division Duplexing (FDD), they are also readily applicable to Half-FDD (H-FDD) or Time Division Duplexing (TDD) with some modifications.

Figure 1:
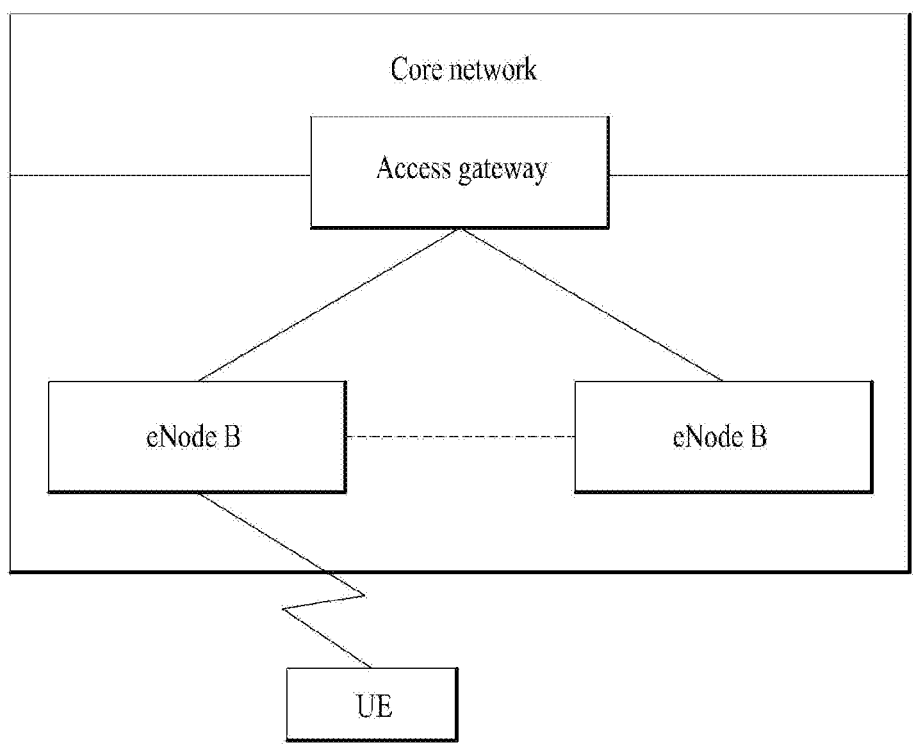
FIG. 1 illustrates a configuration of an E-UMTS network as an example of a wireless communication system.
Figure 2:
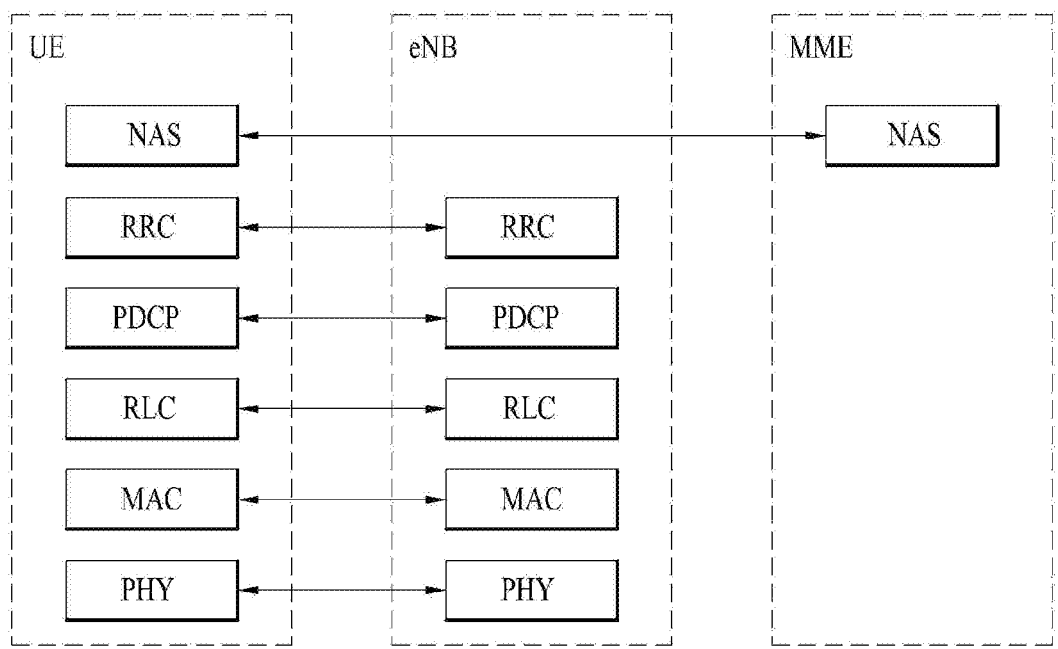
FIG. 2 illustrates a control-plane protocol stack and a user-plane protocol stack in a radio interface protocol architecture conforming to a 3GPP radio access network standard between a UE and an E-UTRAN.
Figure 2:
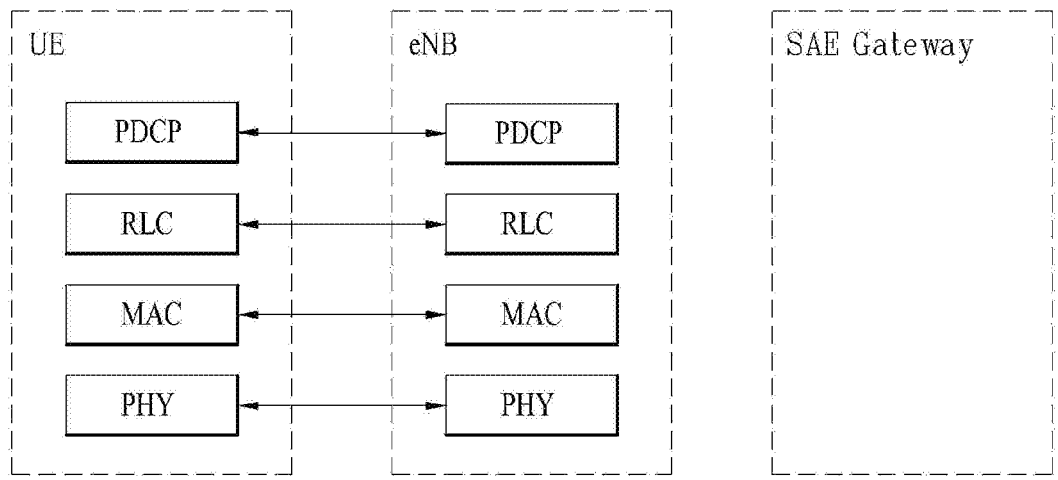

FIG. 2 illustrates control-plane and user-plane protocol stacks in a radio interface protocol architecture conforming to a 3GPP wireless access network standard between a UE and an E-UTRAN. The control plane is a path along which the UE and the E-UTRAN transmit control messages to manage calls, and the user plane is a path along which data generated from an application layer, for example, voice data or Internet packet data is transmitted.

A physical (PHY) layer at Layer 1 (L1) provides information transfer service to a higher layer using physical channels. The PHY layer is connected to a medium access control (MAC) layer, which is a higher layer, via transport channels (transantenna port channels). The transport channels deliver data between the MAC layer and the PHY layer. Data is transmitted on physical channels between the PHY layers of a transmitter and a receiver. The physical channels use time and frequency as radio resources. Specifically, physical channels are modulated using Orthogonal Frequency Division Multiple Access (OFDMA) for downlink and using Single Carrier Frequency Division Multiple Access (SC-1-DMA) for uplink.

The MAC layer at Layer 2 (L2) provides service to a higher layer, i.e. a Radio Link Control (RLC) layer, via logical channels. The RLC layer at L2 supports reliable data transmission. RLC functionality may be implemented in a functional block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. An RB refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

A cell constituting an eNB is set to one of the bandwidths of 1.44, 3, 5, 10, 15 and 20 Mhz and provides DL or UL transmission service to a plurality of UEs in the bandwidth. Different cells may be configured so as to provide different bandwidths.

DL transport channels used to deliver data from the network to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
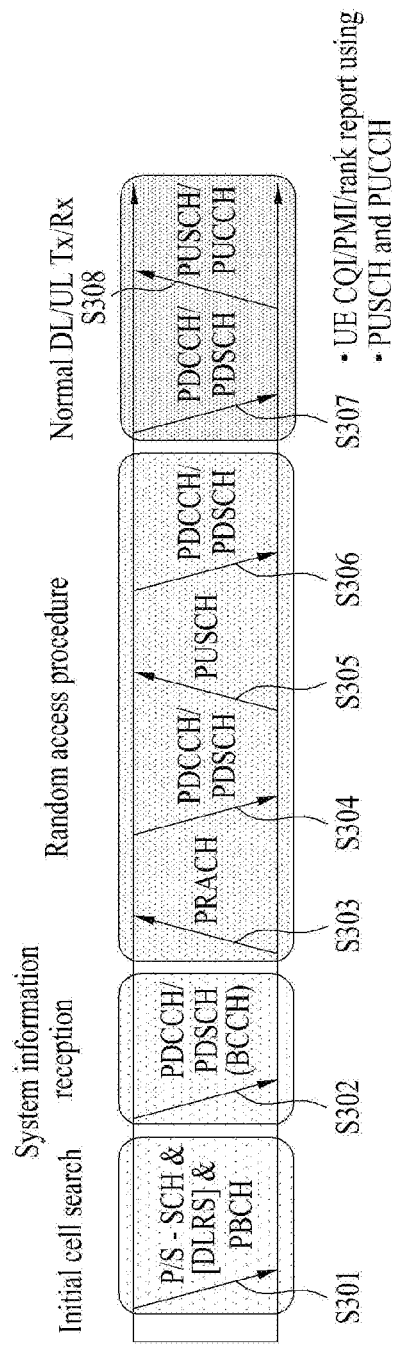
FIG. 3 illustrates physical channels used in a 3GPP system and a general signal transmission method using the physical channels.

FIG. 3 illustrates physical channels used in 3GPP and a general method for transmitting signals on the physical channels.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During initial cell search, the UE may monitor a DL channel state by receiving a DownLink Reference Signal (DL RS).

After initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on UL or receives from the eNB on DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In 3GPP LTE, the UE may transmit control information such as a CQI, a PMI, an RI, etc. on a PUSCH and/or a PUCCH.

Figure 4:
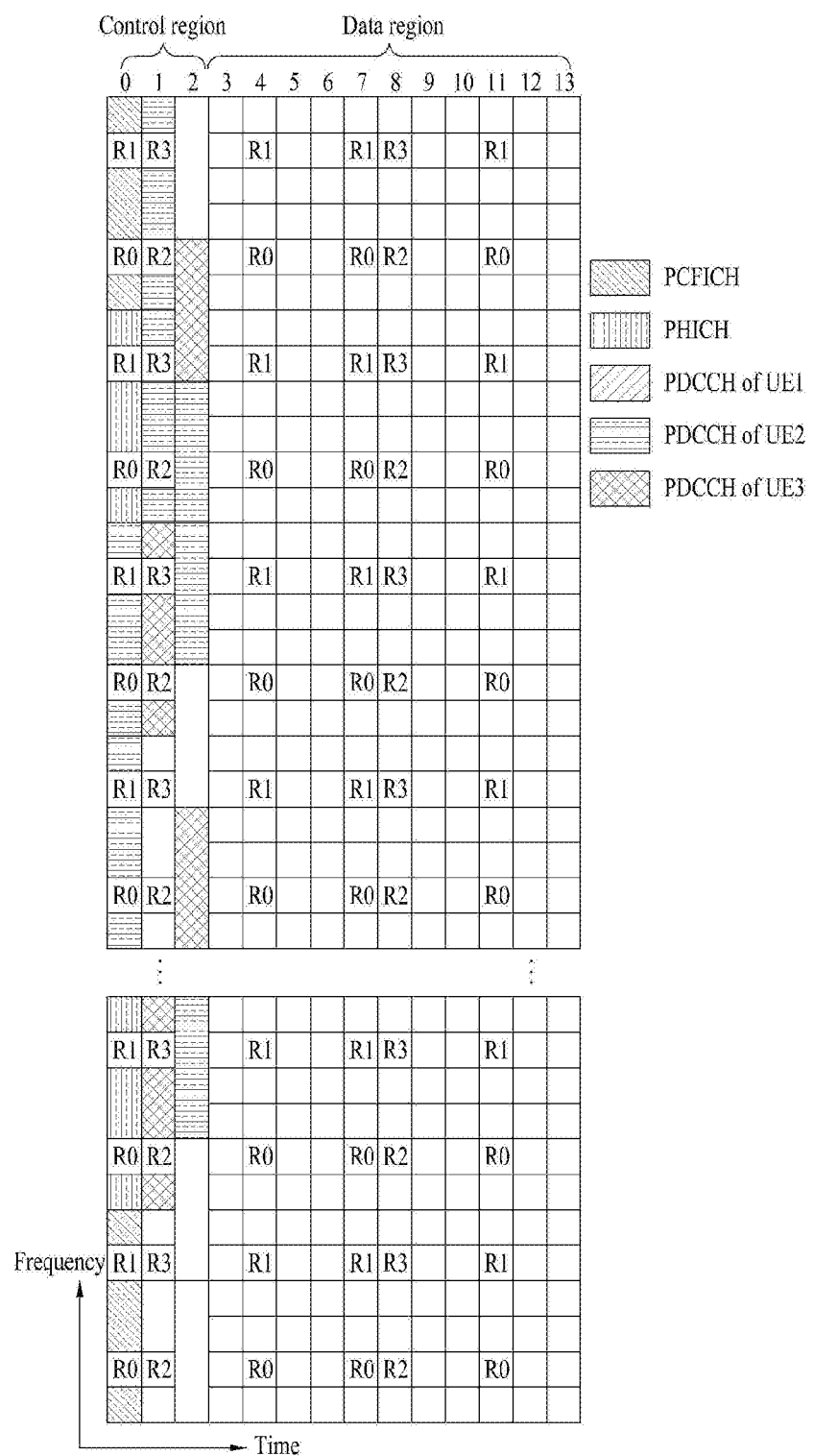
FIG. 4 illustrates a structure of a downlink radio frame used in LTE.

FIG. 4 illustrates control channels included in the control region of a subframe in a downlink radio frame.

Referring to FIG. 4, a subframe includes 14 OFDM symbols. A control region occupies the first one to three OFDM symbols and a data region occupies the other 13 to 11 OFDM symbols in the subframe according to the configuration of the subframe. In FIG. 4, reference characters R1 to R4 denote Reference Signals (RSs) or pilot signals for antenna 0 to antenna 3. RSs are transmitted in a predetermined pattern within a subframe irrespective of the control region and the data region of the subframe. Control channels are allocated to resources unused for RSs in the control region, and traffic channels are allocated to resources unused for RSs in the data region. The control channels of the control region are a Physical Control Format Indicator Channel (PCFICH), a Physical Hybrid-ARQ Indicator Channel (PHICH), a Physical Downlink Control Channel (PDCCH), etc.

The PCFICH indicates the number of OFDM symbols used for PDCCHs in every subframe to UEs. The PCFICH is located in the first OFDM symbol and configured with priority over the PHICH and the PDCCHs. The PCFICH includes four Resource Element Groups (REGs), each REG being distributed across the control region based on a cell Identity (ID). One REG has four REs. An RE is a minimum physical resource defined as one subcarrier by one OFDM symbol. A PCFICH value, which is modulated using Quadrature Phase Shift Keying (QPSK), ranges from 1 to 3 or from 2 to 4 according to a bandwidth.

The PHICH carries HARQ ACK/NACK for uplink transmission. That is, the PHICH is a channel used to deliver HARQ ACK/NACK for uplink HARQ. The PHICH includes one REG and is scrambled cell-specifically. The ACK/NACK is indicated in one bit and modulated using Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. The same PHICH (group) occurs three times to achieve a diversity gain in the frequency and/or time domain.

A PDCCH is allocated to the first n OFDM symbols of a subframe. Here, n is 1 or a larger integer indicated by the PCFICH. The PDCCH includes one or more Control Channel Elements (CCEs). The PDCCH is used to inform a UE or a UE group of the resource allocation of transport channels, namely a PCH and a DownLink SCH (DL-SCH), an uplink scheduling grant, and HARQ information. The PCH and the DL-SCH are transmitted on a PDSCH. Therefore, the eNB and the UE transmit and receive data on a PDSCH except for particular control information or service data.

Information about the destination (one or more UEs) of data of a PDSCH and information about how the UEs should receive and decode the PDSCH data is delivered on a PDCCH. For example, if the Cyclic Redundancy Check (CRC) of a particular PDCCH is masked by Radio Network Temporary Identity (RNTI) "A" and information about data transmitted in radio resources "B" (e.g. a frequency position) with DCI format "C" being a transport format (e.g. a Transport Block (TB) size, a modulation scheme, coding information, etc.) is transmitted in a particular subframe, then UEs within the cell of the eNB monitor the PDCCH using their RNTI information. If one or more UEs have RNTI "A", then the UEs receive the PDCCH and receive a PDSCH indicated by "B" and "C" based on the received information of the PDCCH.

Figure 5:
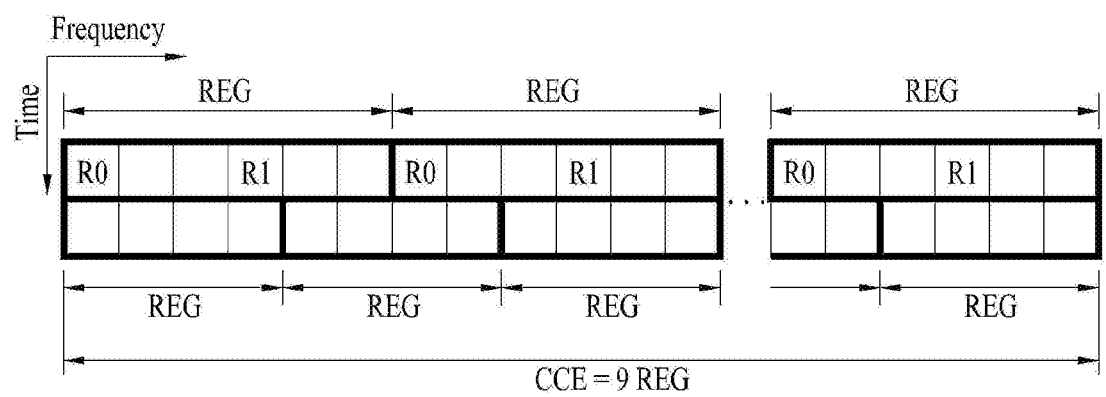
FIG. 5 illustrates resource units used to configure a downlink control channel in LTE.
Figure 5:
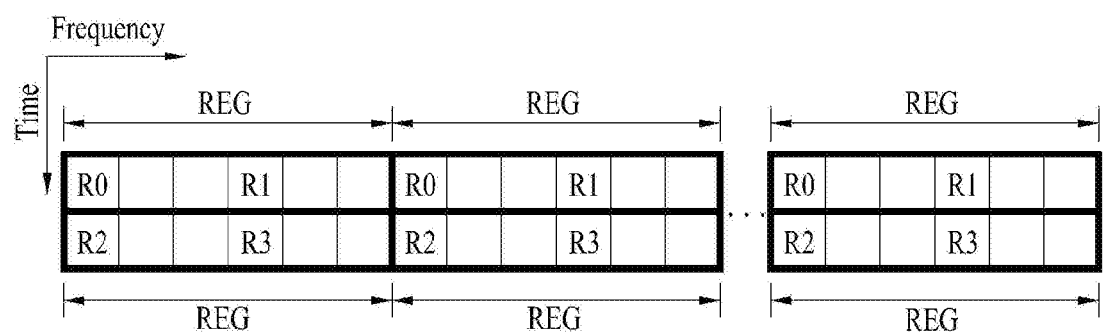

FIG. 5 illustrates resource units used to configure a downlink control channel in LTE. FIG. 5(a) shows a case in which the number of transmit (Tx) antennas is 1 or 2 and FIG. 5(b) shows a case in which the number of Tx antenna is 4. Although a different RS pattern is used according to the number of Tx antennas, REs are configured for a DL control channel in the same manner.

Referring to FIG. 5, a basic resource unit of a DL control channel is an REG. The REG includes four contiguous REs except for REs carrying RSs. REGs are marked with bold lines in FIG. 5. A PCFICH and a PHICH include 4 REGs and 3 REGs, respectively. A PDCCH is configured in units of a control channel element (CCE), each CCE including 9 REGs.

To determine whether a PDCCH including L CCEs is transmitted to a UE, the UE is configured to monitor M(L) (≥L) CCEs that are arranged contiguously or according to a predetermined rule. L that the UE should consider for PDCCH reception may be a plural value. CCE sets that the UE should monitor to receive a PDCCH are referred to as a search space. For example, LTE defines search spaces as illustrated in Table 1.

TABLE 1

| | Search space $s_k^{(L)}$ | | Number of PDCCH |
|---|---|---|---|
| Type | Aggregation level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

In Table 1, L is a CCE aggregation level, that is, the number of CCEs in a PDCCH, Sk(L) is a search space with CCE aggregation level L, and M(L) is the number of candidate PDCCHs to be monitored in the search space with CCE aggregation level L.

Search spaces are classified into a UE-specific search space accessible only by a specific UE and a common search space accessible by all UEs within a cell. A UE monitors common search spaces with CCE aggregation levels 4 and 8 and UE-specific search spaces with CCE aggregation levels 1, 2, 4, and 8. A common search space and a UE-specific search space may overlap each other.

For each CCE aggregation level, the position of the first CCE (a CCE having the smallest index) of a PDCCH search space allocated to a UE changes every subframe. This is called PDCCH search space hashing.

A CCE may be distributed across a system band. More specifically, a plurality of logically contiguous CCEs may be input to an interleaver and the interleaver may permute the sequence of the input CCEs on an REG basis. Accordingly, the time/frequency resources of one CCE are distributed physically across the total time/frequency region of the control region of a subframe. As a control channel is configured in units of a CCE but interleaved in units of an REG, frequency diversity gain and interference randomization gain may be maximized.

Figure 6:
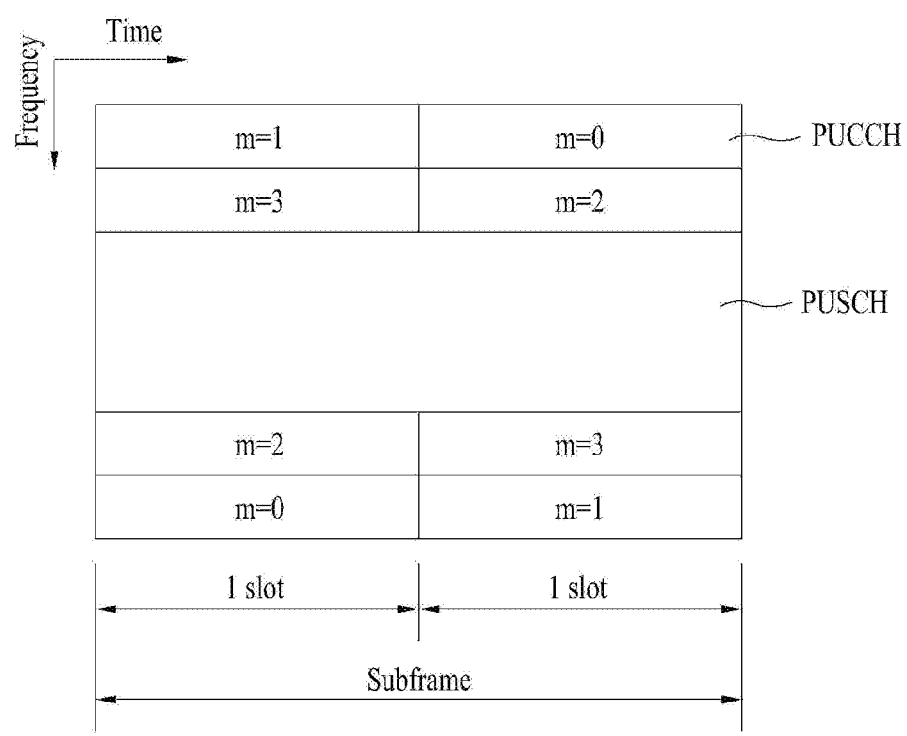
FIG. 6 illustrates a structure of an uplink subframe used in LTE.

FIG. 6 illustrates a structure of a UL subframe in LTE.

Referring to FIG. 6, a UL subframe may be divided into a region to which a physical uplink control channel (PUCCH) carrying control information is allocated and a region to which a physical uplink shared channel (PUSCH) carrying user data is allocated. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for MIMO, and a scheduling request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, m=2, and m=3 are allocated to a subframe in FIG. 6.

Figure 7:
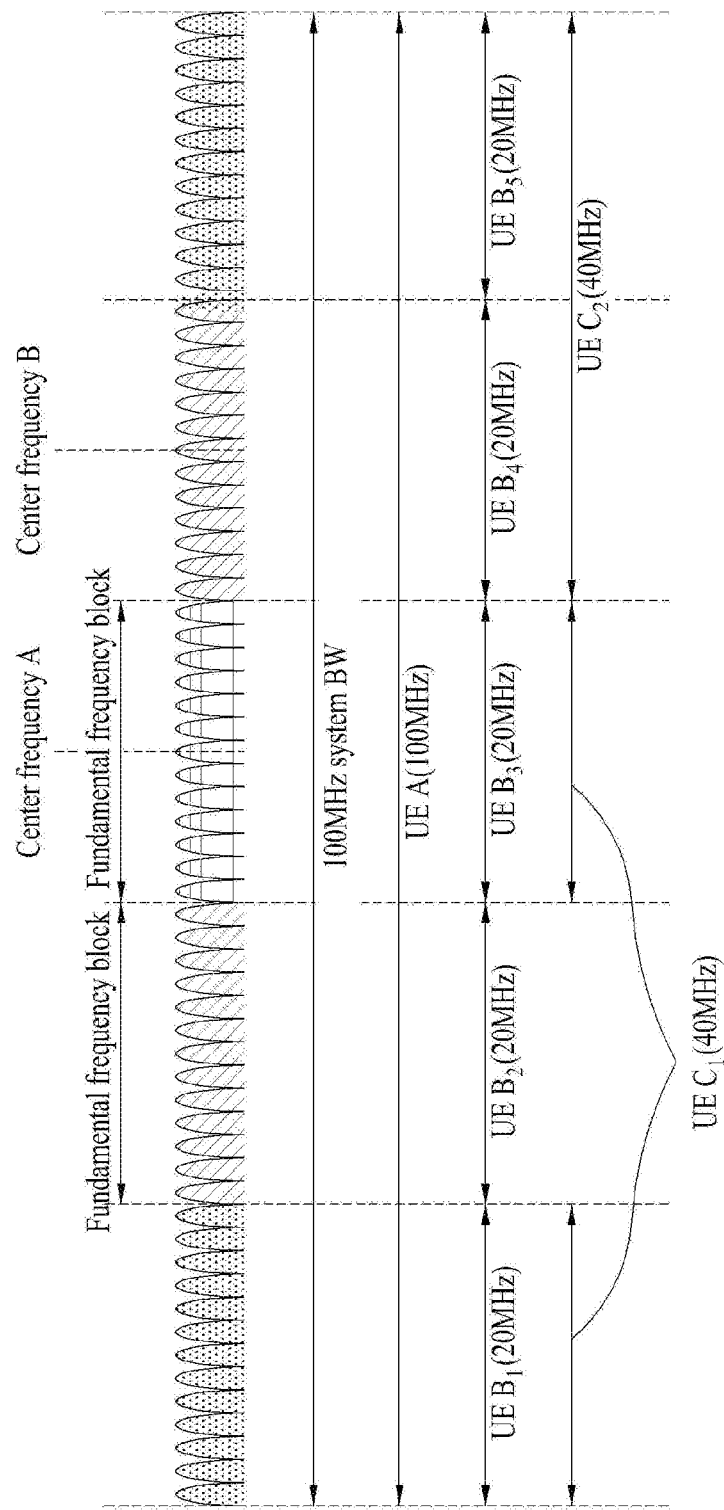
FIG. 7 illustrates carrier aggregation.

FIG. 7 illustrates carrier aggregation.

Carrier aggregation refers to a scheme in which a UE uses a plurality of frequency blocks or (logical) cells composed of UL resources (or component carriers) and/or DL resources (or component carriers) as one wider logical frequency band. According to carrier aggregation, a wireless communication can use a use a wider frequency band. Resources are represented by the term "component carrier" for convenience of description in the following.

Referring to FIG. 7, system bandwidth (BW) is a logical band having a bandwidth of up to 100 MHz. The system bandwidth includes 5 component carriers each of which has a bandwidth of up to 20 MHz. A component carrier includes one or more physically contiguous subcarriers. While the component carriers have the same bandwidth in FIG. 7, the component carriers may have different bandwidths. Furthermore, while the component carriers are contiguous in the frequency domain, FIG. 7 illustrates the logical concept and thus the component carriers may be physically contiguous or separated.

Different center frequencies may be respectively used for the component carriers or a common center frequency may be used for physically contiguous component carriers. For example, if all component carriers are physically contiguous in FIG. 7, then a center frequency A can be used. When the component carriers are not physically contiguous, center frequencies A and B may be used.

A component carrier may correspond to the system bandwidth of a legacy system in the specification. It is possible to easily provide backward compatibility and facilitate system design in a wireless communication environment in which an enhanced UE and a legacy UE coexist by defining the component carrier on the basis of the legacy system. For example, when an LTE-A system supports carrier aggregation, each component carrier can correspond to the system bandwidth of an LTE system. In this case, a component carrier can have one of the bandwidths of 1.25, 2.5, 5, 10 and 20 MHz.

When total system bandwidth is extended according to carrier aggregation, 100 MHz can be used for communication with each UE and communication is performed using all 5 component carriers. UEs $B_1$ to $B_5$ may use only the bandwidth of 20 MHz and perform communication using one component carrier. UEs $C_1$ and $C_2$ may use 40 MHz and performs communication using two component carriers, respectively. These two component carriers may be logically/physically contiguous or noncontiguous. UE $C_1$ corresponds to a case in which two noncontiguous component carriers are used and UE $C_2$ corresponds to a case in which two contiguous component carriers are used.

One DL component carrier and one UL component carrier are used in LTE, whereas a plurality of component carriers may be used in LTE-A, as shown in FIG. 7. Methods for a control channel to schedule a data channel can be divided into linked carrier scheduling and cross carrier scheduling.

More specifically, according to linked carrier scheduling, a control channel transmitted through a specific component carrier schedules only a data channel through the specific component carrier as in the LTE system which uses a single component carrier.

According to cross carrier scheduling, a control channel transmitted through a primary component carrier (CC) schedules a data channel transmitted through the primary CC or another CC using a carrier indicator field (CIF).

Now a detailed description of an RS will be given.

In general, a transmitter transmits an RS known to both the transmitter and a receiver to the receiver along with data so that the receiver may perform channel measurement in the RS. The RS serves to perform demodulation by indicating a modulation scheme as well as channel measurement. The RS is classified into a dedicated RS (DRS) for a specific UE and a common RS (or cell-specific RS (CRS)) for all UEs within a cell. The CRS includes an RS used by a UE to measure a CQI/PMI/RI to be reported to an eNB. This RS is referred to as a channel state information-RS (CSI-RS).

Hereinafter, channel state information (CSI) report will be described. In the current LTE standard, two transmission schemes, i.e., an open-loop MIMO scheme operating without channel information and a closed-loop MIMO scheme based on channel information exist. In particular, in the closed-loop MIMO scheme, in order to obtain multiplexing gain of a MIMO antenna, an eNB and a UE may perform beamforming based on channel state information. The eNB transmits a reference signal to the UE and instructs the UE to feed back the channel state information measured based thereon via a physical uplink control channel (PUCCH) or a physical uplink shared channel (PUSCH), in order to obtain the channel state information from the UE.

The CSI is roughly divided into a rank indicator (RI), a precoding matrix index (PMI) and a channel quality indicator (CQI). First, the RI indicates the rank information of a channel as described above and means the number of streams which may be received by the UE via the same time-frequency resources. In addition, the RI is determined by long term fading of the channel and thus is fed back to the eNB at a period longer than that of the PMI or CQI. Second, the PMI has a channel space property and indicates a precoding index of the eNB preferred by the UE based on a metric such a signal to interference plus noise ratio (SINR). Lastly, the CQI indicates the intensity of the channel and means a reception SINR obtained when the eNB uses the PMI.

Based on measurement of the radio channel, the UE calculates preferred PMI and RI that may derive an optimal or maximum transmission rate if used by the BS under the current channel state, and feeds the calculated PMI and RI back to the BS. In this case, CQI refers to a modulation and coding scheme that provides packet error probability available for the PMI/RI which is fed back.

Next, a method for calculating CSI, particularly CQI defined in the current 3GPP standard document will be described. Generally, the UE identifies a channel state using a reference signal (RS) transmitted from an eNB, particularly CSI-RS, and selects CQI index corresponding to a modulation and coding scheme (MCS) of which BLER (block error rate) does not exceed 10% under the status that a predetermined condition defined for CQI calculation is assumed, from the following Table 2 and reports the selected CQI index to the eNB.

TABLE 2

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

The procedure of calculating CQI will be described in more detail.

First of all, the UE receives a reference signal from the BS, and selects the best PMI for each rank based on a predefined PMI codebook by using the received reference signal, and calculates a signal to interference plus noise ratio (SINR) per layer in accordance with the selected best PMI. Also, SINR per codeword is calculated based on the SINR per layer and a codeword to layer mapping rule.

Next, spectral efficiency (SE) that satisfies 10% of BLER (block error rate) from the SINR per codeword, and throughput per codeword is calculated using the number $N_{RE}$ of resource elements available for PDSCH.

Also, a throughput sum per rank is calculated based on the throughput per codeword, and the largest throughput and rank corresponding to the largest throughput are selected.

That is, RI is determined. Also, in a CQI table of Table 5 above, values obtained by multiplying NRE of PDSCH by the SE are compared with the largest throughput, whereby the most similar CQI index is reported to the BS.

Meanwhile, assumption for reference resources for CQI measurement as listed in Table 2 below is defined in the LTE system, and includes assumption for N of PDSCH required for the procedure of calculating CQI. In this case, the reference resource means a resource region that assumes application of the corresponding CQI, and it is assumed that the UE receives one or more reference signals from the BS, measures CQI based on the reference signal, and PDSCH corresponding to CQI is transmitted under the assumption of Table 3 below. However, the corresponding reference resource is required to be a valid downlink subframe for CSI measurement, and a valid subframe (Valid CSI Measurement Subframe) used for channel state information measurement is defined in the LTE system as listed in Table 4 below.

TABLE 3

The first 3 OFDM symbols are occupied by control signalling
No resource elements used by primary or secondary synchronisation signals or PBCH
CP length of the non-MBSFN subframes
Redundancy Version 0
If CSI-RS is used for channel measurements, the ratio of PDSCH EPRE to CSI-RS EPRE is as given by higher layer signaling
For transmission mode 9 CSI reporting:
   CRS REs are as in non-MBSFN subframes;
   If the UE is configured for PMI/RI reporting, the UE-specific reference signal overhead is consistent with the most recent reported rank; and PDSCH signals on antenna ports $\{7 \ldots 6 + \upsilon\}$ for $\upsilon$ layers would result in signals equivalent to corresponding symbols transmitted on antenna ports $$\{15 \ldots 14 + P\}, \text{ as given by } \begin{bmatrix} y^{(15)}(i) \\ \vdots \\ y^{(14+P)}(i) \end{bmatrix} = W(i) \begin{bmatrix} x^{(0)}(i) \\ \vdots \\ x^{(\upsilon-1)}(i) \end{bmatrix}, \text{ where}$$

$x(i) = [x^{(0)}(i) \ldots x^{(\upsilon-1)}(i)]^T$ is a vector of symbols from the layer mapping, $P \in \{1,2,4,8\}$ is the number of CSI-RS ports configured, and if only one CSI-RS port is configured, W(i) is 1, otherwise W(i) is the precoding matrix corresponding to the reported PMI applicable to x(i). The corresponding PDSCH signals transmitted on antenna ports $\{15 \ldots 14 + P\}$ would have a ratio of EPRE to CSI-RS EPRE equal to the ratio given by higher layer signaling.
Assume no REs allocated for CSI-RS and zero-power CSI-RS
Assume no REs allocated for PRS
The PDSCH transmission scheme depending on the transmission mode currently configured for the UE (which may be the default mode).
If CRS is used for channel measurements, the ratio of PDSCH EPRE to cell-specific RS EPRE is as given by higher layer signaling with the exception of $\rho_A$ which shall be assumed to be
   $\rho_A = P_A + \Delta_{offset} + 10\log_{10}(2)$ [dB] for any modulation scheme, if the UE is configured with transmission mode 2 with 4 cell-specific antenna ports, or transmission mode 3 with 4 cell-specific antenna ports and the associated RI is equal to one;
   $\rho_A = P_A + \Delta_{offset}$ [dB] for any modulation scheme and any number of layers, otherwise.
The shift $\Delta_{offset}$ is given by the parameter nomPDSCH-RS-EPRE-Offset which is configured by higher-layer signalling.

TABLE 4

In case multiple cells with different uplink-downlink configurations are aggregated and the UE is not capable of simultaneous reception and transmission in the TABLE 4-continued aggregated cells, the following constraints apply:
  If the subframe in the primary cell is a downlink subframe, the UE shall not
  transmit any signal or channel on a secondary cell in the same subframe
  If the subframe in the primary cell is an uplink subframe, the UE is not
  expected to receive any downlink transmissions on a secondary cell in the same
  subframe
  If the subframe in the primary cell is a special subframe and the same
  subframe in a secondary cell is a downlink subframe, the UE is not
  expected to receive PDSCH/EPDCCH/PMCH/PRS transmissions in the
  secondary cell in the same subframe, and the UE is not expected to receive
  any other signals on the secondary cell in OFDM symbols that overlaps
  with the guard period or UpPTS in the primary cell.
A downlink subframe in a serving cell shall be considered to be valid if:
  it is configured as a downlink subframe for that UE, and
  in case multiple cells with different uplink-downlink configurations are
  aggregated and the UE is not capable of simultaneous reception and
  transmission in the aggregated cells, the subframe in the primary cell is a
  downlink subframe or a special subframe with the length of DwPTS more than
  $7680 \cdot T_s$, and
  except for transmission mode 9 or 10, it is not an MBSFN subframe, and
  it does not contain a DwPTS field in case the length of DwPTS is $7680 \cdot T_s$ and
  less, and
  it does not fall within a configured measurement gap for that UE, and
  for periodic CSI reporting, it is an element of the CSI subframe set linked
  to the periodic CSI report when that UE is configured with CSI subframe sets,
and
for a UE configured in transmission mode 10 with multiple configured CSI
processes, and aperiodic CSI reporting for a CSI process, it is an element of the
CSI subframe set linked to the downlink subframe with the corresponding CSI
request in an uplink DCI format, when that UE is configured with CSI subframe
sets for the CSI process.

For example, the first assumption of Table 3 means assumption that PDSCH is not transmitted to first three OFDM symbols within one subframe when CQI is calculated. This means that the UE which cannot know the number of PDCCH symbols of subframe to which the corresponding CQI is applied calculates CQI by assuming the maximum number of symbols to which PDCCH may be transmitted because the PDCCH may be varied per subframe.

The BS to which the CQI calculated as above is transmitted may determine a downlink transmission block size, etc. by adding a separate compensation value to be suitable for a configuration (for example, the number of PDCCH symbols of subframe to which the corresponding CQI is applied) actually applied to downlink transmission corresponding to the corresponding CQI.

As more communication devices require greater communication capacity, a future-generation wireless communication system seeks to efficiently utilize a limited frequency band. In this context, in a cellular communication system such as the LTE system, a method for using an unlicensed band of 2.4 GHz used by the legacy WiFi system or an unlicensed band of 5 GHz newly issued in traffic offloading is under consideration.

Since it is basically assumed that wireless transmission and reception is performed in an unlicensed band through contention between communication nodes, each communication node is requested to make sure that another communication node is not transmitting a signal in the unlicensed band, by performing channel sensing before transmitting a signal. This operation is called LBT (listen before talk), particularly an operation for identifying whether another communication node is transmitting a signal is defined as carrier sensing (CS), and a case for determining that another communication node does not transmit a signal is defined that clear channel assessment (CCA) is identified.

An eNB or UE of the LTE system should perform LBT to perform signal transmission in the unlicensed band (referred to as LTE-U band or U-band). Also, when the eNB or the UE of the LTE system transmits a signal, nodes conforming to other communication standards such as Wi-Fi should not interfere with the eNB or the UE by performing LBT. For example, a Wi-Fi standard (801.11ac) regulates that a CCA threshold is −62 dBm for a non-Wi-Fi signal and −82 dBm for a Wi-Fi signal. This means that upon receipt of a non-Wi-Fi signal with power equal to or higher than −62 dBm, a station (STA) or an access point (AP) does not transmit a signal in order not to cause interference.

Since downlink transmission of the eNB or uplink transmission of the UE in the U-band may not be always ensured as described above, an LTE UE operating in the U-band may maintain connection to another cell operating in the L-band (licensed band) for stable control such as mobility or RRM (radio resource measurement) function. In the present invention, a cell to which the UE is connected in the U-band will be referred to as USCell, and a cell to which the UE is connected in the L-band will be referred to as PCell. Also, a method for performing data transmission and reception in the U-band by means of combination with the L-band will generally be referred to as LAA (licensed assisted access).

Generally, the UE is operated to prevent a change of a channel and interference for a very short moment from affecting entire CSI measurement and measure stable CSI by measuring CSI on the basis of intensity of a signal and interference measured while observing eNB transmission for a relatively long time. However, in case of transmission accompanied with LBT in the E-U band, or if a radio node performs transmission intermittently only if data transmission is required for other reasons, a problem may occur in CSI measurement of the UE. That is, if the eNB performs transmission intermittently, the UE does not know the time when there is no signal of the eNB and attempts measurement of channel and interference even at that time, whereby the UE reflects the measured result in calculation of CSI. As a result, a problem occurs in that accuracy of CSI is lowered.

To solve this problem, the present invention suggests a method for enabling a UE to attempt detection as to whether the eNB transmits a signal at a position which is previously designated and measure CSI.

First of all, the eNB attempts to transmit a specific signal by using time/frequency resources which are previously defined and periodically generated. However, whether the corresponding signal is actually transmitted at each timing point may be determined depending on CCA in the U-band, for example. As an example of the signal, there is a discovery reference signal (DRS) transmitted by the UE adjacent to the eNB to find a cell generated by the eNB and derive access attempt even in a state that there is no data to be transmitted. The DRS includes a signal, which is previously known, such as PSS (Primary Synchronization Signal)/SSS (Secondary Synchronization Signal)/CRS (Cell specific Reference Signal)/CSI-RS (CSI Reference Signal). Therefore, the UE attempts detection of the corresponding signal at each DRS transmission candidate timing point, and if the DRS is detected, for example, if a correlator output of the corresponding signal is a certain value or more, the UE may determine that the DRS is actually transmitted at the corresponding DRS candidate timing point. This is defined as BD (blind detection) of the DRS. A DRS candidate position of each cell, that is, a cycle for transmitting the DRS and subframe offset may previously be delivered to the UE.

The UE performs BD at each DRS candidate position, and if the DRS is detected, regards that the corresponding timing point satisfies a condition for a valid CSI reference resource. Also, if the corresponding DRS includes a CRS or CSI-RS and CSI-IM (CSI-Interference Measurement), which are valid for CSI measurement, the UE performs CSI measurement by using a measured value of the corresponding DRS. In this procedure, the UE performs BD at only a DRS candidate position which is previously determined. Therefore, the UE may avoid an unnecessary operation for attempting to receive eNB signal or performing BD at a random time to measure CSI, whereby power consumption may be reduced. Particularly, since the UE does not need to perform BD operation at other position except the DRS candidate position, even though the eNB actually transmits a signal at a point not the DRS candidate position, the corresponding point may be regarded as being invalid as the CSI reference resource. This is to prevent positions of CSI reference resources from being assumed to be different from one another under the assumption that the eNB and the UE are not conform to each other in performing BD.

Moreover, even though the corresponding UE is receiving a signal, for example, PDSCH from the eNB, the point not the DRS position may be regarded as being invalid as the CSI reference resource. If the corresponding point is valid, the UE should store a sample for CSI measurement. However, the UE may know that a signal is transmitted thereto at the corresponding timing point, only if PDCCH should be received at the same timing point. Therefore, load occurs in that the UE should always process and buffer the signal of the corresponding point while reception and decoding of the PDCCH are ending.

Meanwhile, the signal, such as DRS, subjected to BD performed by the UE may be transmitted once through a plurality of subframes to deliver a sufficient number of measurement signals. At this time, a length of a transmission period of an individual DRS may previously be notified to the UE. In this case, a transmission period of every DRS may be referred to as DRS opportunity. In the operation of the UE for measuring CSI, the UE first performs BD for PSS/SSS/CRS/CSI-RS, which are transmitted from some subframes or some OFDM symbols of the front part of DRS opportunity, or some of them, and if the presence of the DRS is identified by signal detection, the UE may assume that the DRS is continuously transmitted for a full period of the corresponding DRS opportunity. Therefore, even though the DRS is transmitted through a plurality of subframes, the UE may perform BD for only the front part of the DRS opportunity, and may determine whether to regard the other parts as valid CSI reference resources, as a result of BD at the front part. Through this procedure, power consumption of the UE may be reduced significantly.

Figure 8:
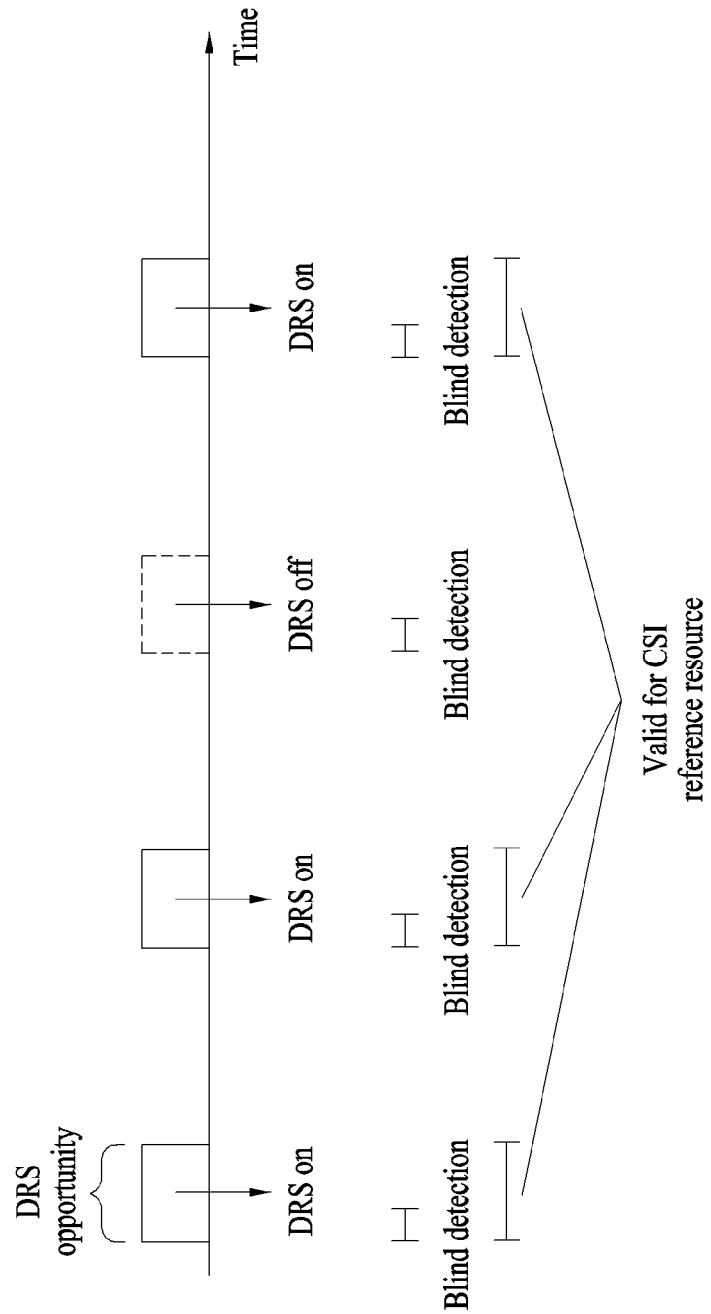
FIG. 8 illustrates an example of configuration of valid CSI reference resource in accordance with the embodiment of the present invention.

FIG. 8 illustrates an example of configuration of valid CSI reference resource in accordance with the embodiment of the present invention.

Referring to FIG. 8, if the DRS is not transmitted at the third DRS opportunity and is detected after the UE performs BD at a start point of every DRS opportunity, the UE is operated to regard that the corresponding CRS opportunity is valid as CSI reference resource.

In the aforementioned operation, it may be difficult to normally measure CSI in a part of a time domain of DRS opportunity for performing BD. This is because that transmission of the DRS is not identified at the period for performing BD and thus there may be a difficulty in regarding the corresponding period as DRS and making a target for CSI measurement. Therefore, even in case of the inside of the DRS opportunity, where the DRS is detected by BD, the UE may be operated to regard a time period that includes a signal for performing BD, for example, some subframes at the front inside the DRS opportunity or subframe that includes PSS/SSS and previous subframes, as being invalid as the CSI reference resource.

In accordance with this method, the UE and the eNB may determine CSI reference resource. For example, when the UE reports CSI at subframe # n, the UE may be operated such that the corresponding CSI reference resource may be subframe #(n-k) which is a predefined reference subframe, or a valid subframe generated most recently on a time among subframes located prior to the subframe #(n-k).

Although the operation of the present invention has been described based on the DRS as an example, the operation of the present invention may equally be applied to even a case that opportunity of RS having another type is periodically generated. Also, even in the case that a time length occupied by opportunity of DRS or RS in addition to the DRS may be changed every time depending on load of traffic, a minimum transmission length at an individual opportunity is defined, whereby the UE may determine that there is signal transmission of the eNB from the time when the RS is detected as a result of BD to the minimum length, and may perform CSI measurement while regarding CSI reference resource.

The aforementioned method is applicable to another type of measurement such as RSRP (Reference signal received power) or RSSI (Received signal strength indicator) as well as measurement of CSI. That is, BD is performed for some area corresponding to the front of opportunity of DRS or RS other than the DRS, and if detection is determined, measurement of RSRP or RSSI is performed using a designated (minimum) period.

Figure 9:
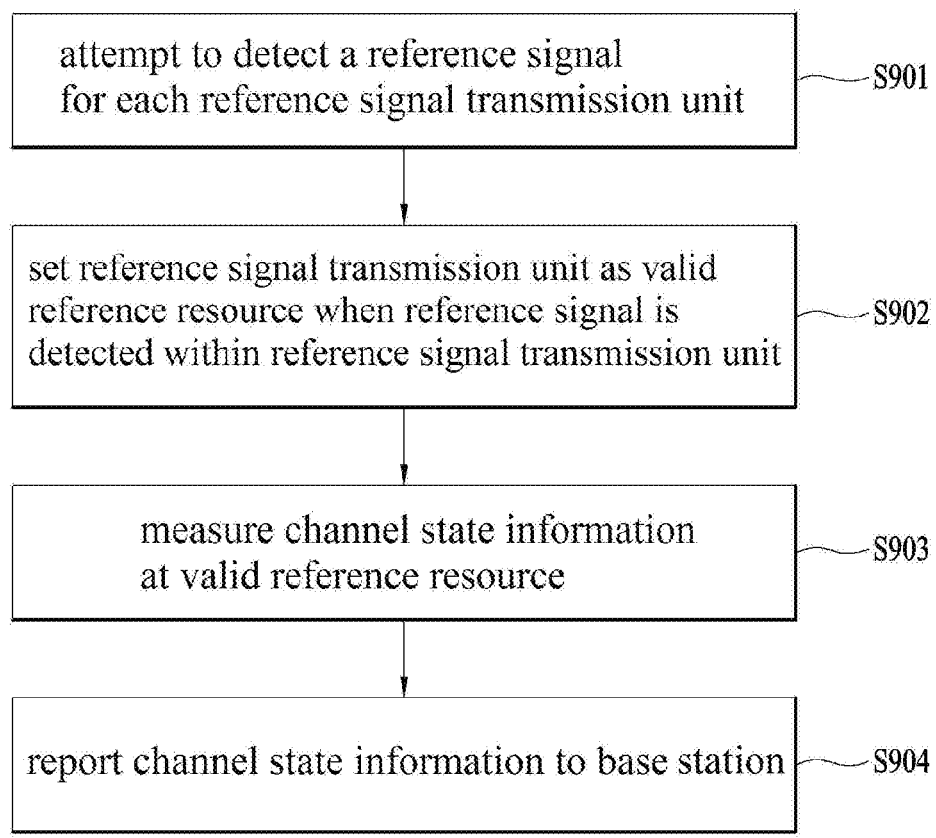
FIG. 9 is a flow chart illustrating an example of measuring and reporting CSI in accordance with the embodiment the present invention.

FIG. 9 is a flow chart illustrating an example of measuring and reporting CSI in accordance with the embodiment the present invention.

Referring to FIG. 9, the UE attempts to detect a reference signal transmitted repeatedly a plurality of times through an unlicensed band per reference signal transmission unit, that is, opportunity of RS. In this case, the reference signal may include at least one of PSS (Primary Synchronization Signal), SSS (Secondary Synchronization Signal), CRS (Cell specific Reference Signal) and CSI-RS (CSI Reference Signal).

If the reference signal is detected at a preset period within the reference signal transmission unit in step S902, the reference signal transmission unit is configured as a valid reference resource for the channel state information. Preferably, a period excluding the preset period from the reference signal transmission unit may be configured as a valid reference resource for the channel state information. The preset period is located at the front end of the reference signal transmission unit.

Afterwards, the UE measures the channel state information on the unlicensed band at the valid reference resource in step S903, and reports the channel state information on the unlicensed band to the BS in step S904.

Figure 10:
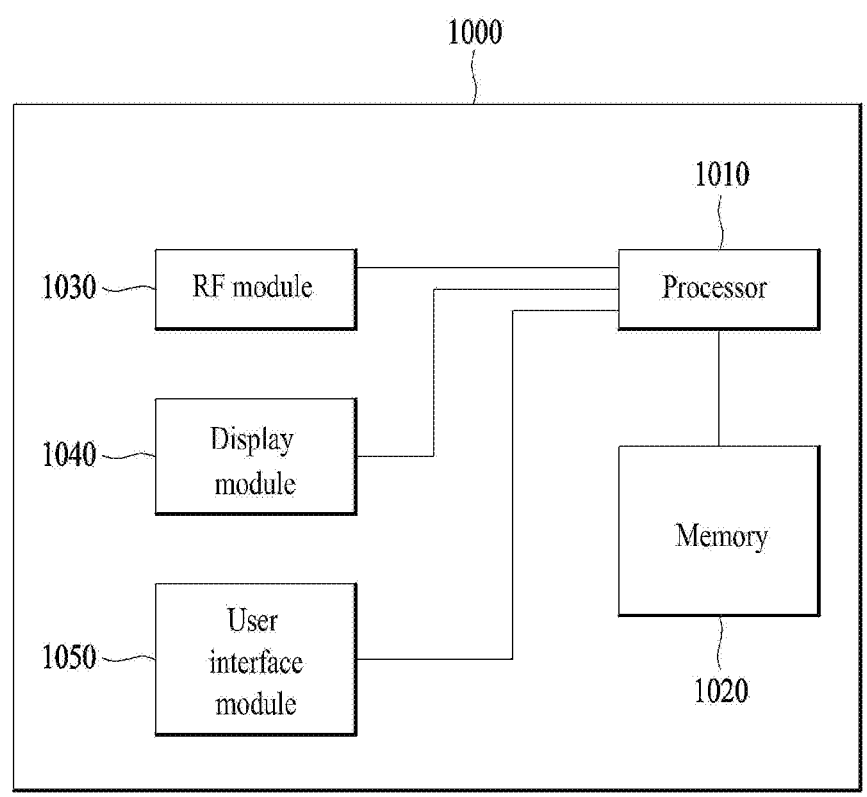
FIG. 10 is a block diagram of a communication apparatus according to an embodiment of the present invention.

FIG. 10 is a block diagram of a communication apparatus according to an embodiment of the present invention.

Referring to FIG. 10, a communication apparatus 1000 includes a processor 1010, a memory 1020, an RF module 1030, a display module 1040 and a user interface module 1050.

The communication apparatus 1000 is illustrated for convenience of description and some modules may be omitted. Furthermore, the communication apparatus 1000 may further include necessary modules. Some modules of the communication apparatus 1000 may be subdivided. The processor 1010 is configured to perform operations according to the embodiments of the present invention, described with reference to attached drawings. Refer to descriptions of FIGS. 1 to 9 for detailed operations of the processor 1010.

The memory 1020 is connected to the processor 1010 and stores an operating system, applications, program code, data, etc. The RF module 1030 is connected to the processor 1010 and converts baseband signals into RF signals or converts RF signals into baseband signals. To achieve this, the RF module 1030 performs analog conversion, amplification, filtering and frequency upconversion or reverse operations thereof. The display module 1040 is connected to the processor 1010 and displays various types of information. The display module 1040 may use a well-known element such as an LCD (Liquid Crystal Display), LED (Light Emitting Diode), OLED (Organic Light Emitting Diode) or the like. However, the display module 1040 is not limited thereto. The user interface module 1050 may be connected to the processor 1010 and configured in the form of a combination of well-known user interfaces such as a keypad, touchscreen and the like.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although the aforementioned method for reporting channel state information for discontinuous transmission in a wireless communication system and the device for the same have been described based on the 3GPP LTE system, the method and the device may be applied to various wireless communication systems in addition to the 3GPP LTE system.

The invention claimed is:

1. A method for reporting channel state information from a user equipment (UE) to a base station in a wireless communication system, the method comprising:
    attempting to detect a reference signal within a preconfigured time interval included in a reference signal transmission time unit,
    wherein the reference signal includes at least one of a Primary Synchronization Signal (PSS), a Secondary Synchronization Signal (SSS), a Cell specific Reference Signal (CRS) and a Channel State Information Reference Signal (CSI-RS);
    when the reference signal is detected within the preconfigured time interval included in the reference signal transmission time unit and when the detected reference signal includes one of the CRS and CSI-RS, configuring the detected reference signal transmission time unit as a valid reference resource for the CSI;
    measuring the CSI based on the valid reference resource; and
    reporting the CSI to the base station,
    wherein the preconfigured time interval included in the reference signal transmission time unit is excluded from the valid reference resource for the CSI,
    wherein a length of the preconfigured time interval is determined according to a traffic load,
    wherein the length of the preconfigured time interval is a threshold value, and
    wherein a time interval corresponding to the threshold value is excluded from the valid reference resource for the CSI.

2. The method according to claim 1, wherein the preconfigured time interval is located at a front end of the reference signal transmission time unit.

3. The method according to claim 1, wherein the CSI is on an unlicensed band.

4. A user equipment (UE) in a wireless communication system, the UE comprising:
a transmitter and receiver; and
a processor, operatively coupled to the transmitter and receiver,
wherein the processor is configured to:
attempt to detect a reference signal within a preconfigured time interval included in a reference signal transmission time unit,
wherein the reference signal includes at least one of a Primary Synchronization Signal (PSS), a Secondary Synchronization Signal (SSS), a Cell specific Reference Signal (CRS) and a Channel State Information Reference Signal (CSI-RS);
configure the detected reference signal transmission time unit as a valid reference resource for the CSI, when the reference signal is detected within the preconfigured time interval included in the reference signal transmission time unit and when the detected reference signal includes one of the CRS and CSI-RS; and
measure the CSI based on the valid reference resource, and
control the transmitter to transmit the CSI to a base station,
wherein the preconfigured time interval included in the reference signal transmission time unit is excluded from the valid reference resource for the CSI,
wherein a length of the preconfigured time interval is determined according to a traffic load,
wherein the length of the preconfigured time interval is a threshold value, and
wherein a time interval corresponding to the threshold value is excluded from the valid reference resource for the CSI.

5. The UE according to claim 4, wherein the preconfigured time interval is located at a front end of the reference signal transmission time unit.

6. The UE according to claim 4, wherein the CSI is on an unlicensed band.

* * * * *